Nov. 11, 1952  R. L. EVANS  2,617,459
NUT SHELLING DEVICE
Filed July 30, 1949
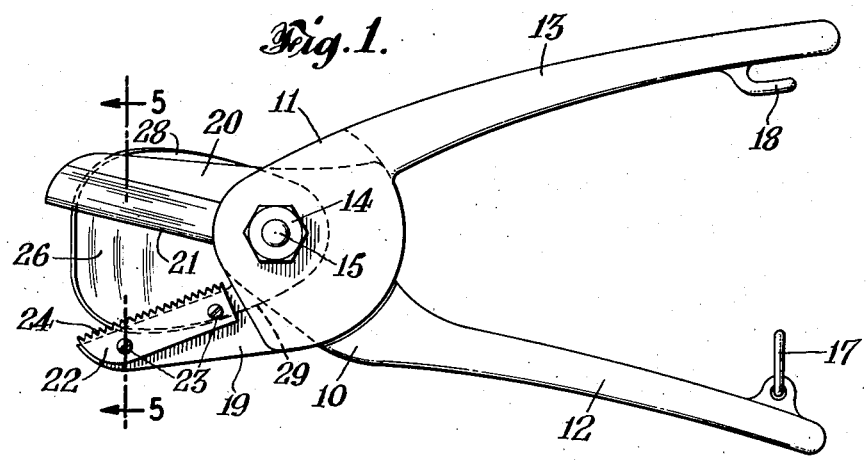
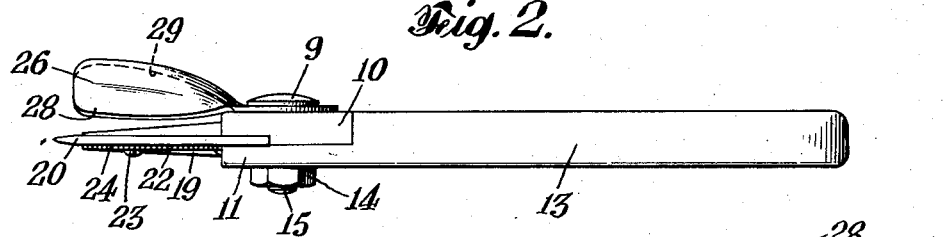
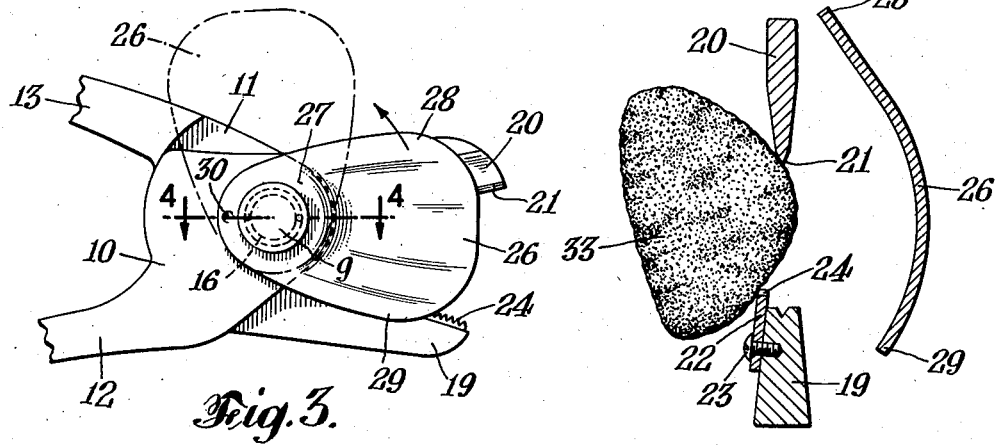
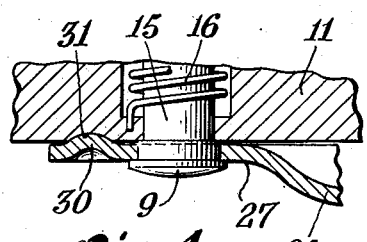
INVENTOR
RALPH L. EVANS
ATTORNEYS Patented Nov. 11, 1952

2,617,459

UNITED STATES PATENT OFFICE 2,617,459

NUT SHELLING DEVICE

Ralph L. Evans, Bay Shore, N. Y.

Application July 30, 1949, Serial No. 107,697

2 Claims. (Cl. 146—16)

The present invention relates to a hand tool for the peeling or shelling of nuts.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate an embodiment of the invention, and together with the description, serve to explain the principles of the invention.

Of the drawings:

Fig. 1 is a side elevation of a typical and illustrative embodiment of the invention;

Fig. 2 is a top plan view of the device as seen in Fig. 1;

Fig. 3 is a side elevation of the jaw portion of the device as viewed from the opposite side of Fig. 1;

Fig. 4 is a cross-sectional view taken along line 4—4 of Fig. 3; and

Fig. 5 is a cross-sectional view taken along line 5—5 of Fig. 1, showing a nut in position between the jaws of the tool.

The invention has for an object the provision of a relatively simple and economical tool for the peeling or shelling of all types of nuts such as, for example, pecans, Brazil nuts and the like. A further object is the provision of a nut shelling tool which is easily held in the hand and manipulated to efficiently and safely remove the shell with a minimum of damage or breakage to the nut meat.

With the above and other objects in view there is provided in a typical and illustrative embodiment of the invention as herein shown and disclosed a pair of pivotally connected levers providing jaws at one side of the pivot to engage and remove the shell from a nut and shafts at the other side of the pivot for grasping in the hand to actuate the jaws. One of said jaws is provided with a relatively sharp cutting edge, while the other is provided with a serrated edge having sharp points spaced therealong. The nut to be shelled is inserted between the jaws and the latter closed to engage the shell, the serrated edge serving to engage and securely hold the shell at one side while the opposed cutting edge cuts through the shell and engages under it, whereafter by suitable manipulation the shell, or a portion of it, may be stripped off. The serrated and cutting edges are advantageously somewhat displaced or offset from each other axially with respect to the pivot between the jaws, so that increasing pressure on the curved surface of a nut shell serves to more securely position and hold the nut for shelling, rather than force it out of the jaws. Readily positionable guard means are provided to deflect flying bits of shell and cause them to fall vertically out of the tool.

It will be understood that the foregoing general description and the following detailed description as well are exemplary and explanatory of the invention but are not restrictive thereof.

Referring now in detail to the embodiment of the invention shown in the accompanying drawings, the nut shelling tool comprises a pair of lever elements indicated generally by the numerals 10 and 11, which are secured together for pivotal movement about the axis of a shaft 15 and held in assembled position by means of the enlarged head 9 and threaded nut 14 on said shaft. The elements 10 and 11 include shaft portions 12 and 13 respectively to be grasped in the hand and closed or moved together to close the jaws to shell a nut therebetween. A coiled spring 16 is positioned about the shaft 15 and engaging the elements 10 and 11 urging them to open position, and any suitable mechanism such as a hook 17 and catch member 18 may be provided for maintaining the elements in closed position against the pressure of said spring.

As shown, the elements 10 and 11 are provided with jaw portions 19 and 20 respectively at their other ends beyond the shaft 15 from their shaft portions 12 and 13. The jaw portion 20, as best shown in Fig. 5, is formed as a knife blade having the cutting edge 21 positioned toward the other jaw portion. The opposed jaw portion 19 is provided with a removable serrated member 22 extending along the length thereof and held thereto by screws 23, said member having a plurality of pointed teeth 24 along the edge thereof.

A guard member 26 is preferably provided, comprising a curved or cupped plate with its concave face toward the jaw portions 19 and 20, having a flat portion at 27 apertured to receive the shaft 15 whereby the guard is held in assembled position with respect to the lever elements. The guard 26 at one edge 28 is relatively closely positioned with respect to the jaw portion 20, while at its opposite edge 29 it is relatively widely spaced from jaw portion 19, so that when the shelling device is properly held in the hand with the jaw portion 20 and shaft 15 upwardly, flying shell particles will be deflected downwardly away from the face of the user. An indentation 30 on guard 26 is adapted to seat in a depression 31 in the lever element 11 as shown in detail in Fig. 4 of the drawings, serving to normally hold the guard in guarding position across the space between the jaw portions 19 and 20, but permitting the guard to be deflected slightly and rotated about shaft 15 as indicated by the broken line position in Fig. 3, should it prove to be in the way.

As clearly shown in Fig. 5, a nut such as a Brazil nut 33 may be positioned between the jaws 19 and 20, the user holding the shelling device in one hand and positioning the nut with the other. The nut 33 is preferably inserted to only a small extent between the jaws, and even though a relatively broadly curved portion of the shell is inserted therein, so that the edges 21 and 24 define a relatively shallow chord across the body of the nut, the shelling function is successfully accomplished. The jaws are then forced closed, the points 24 serving to engage and tightly hold the shell on one side while the cutting edge 21 penetrates the shell opposite thereto, whereby a portion of the shell either is cracked off immediately or may be cut off. The nut is shelled by progressive operations of the type described.

It will be noted that the points 24 are not directly opposed to cutting edge 21, but are somewhat displaced from said edge along the axis of the pivotal interconnection between the lever members 10 and 11, whereby with increasing pressure between the jaws the nut tends to be drawn further between the jaws. This action resists the tendency of the nut to be expelled from between the jaws because of the curvature of the shell, and the nut is securely held for shelling even though the curvature to which the jaws are applied be relatively slight.

The invention in its broader aspects is not limited to the specific mechanisms shown and described but departures may be made therefrom, within the scope of the accompanying claims, without departing from the principles of the invention and without sacrificing its chief advantages.

What I claim is:

1. A device of the character described comprising, in combination, a pair of lever elements pivotally interconnected for relative movement about an axis, having a pair of opposed jaw portions, one of said jaw portions having a knife-like cutting edge bevelled to a central cutting edge and the other of said jaw portions having a grooved jaw portion with a serrated member secured along the length and at one side thereof, said cutting edge abutting the groove in the jaw portion with the serrated member being laterally offset and free from contact with said serrated edge, and a guard member connected to the pivotal point of said lever elements on the side of the lever element containing the cutting edge and adapted to substantially cover off the space between said jaw portions when opened, said guard member being offset adjacent said cutting edge.

2. A device in accordance with claim 1 wherein said guard member has a cupped formation, the concave surface of which is directed toward said jaw portions.

RALPH L. EVANS.

REFERENCES CITED

The following references are of record in the file of this patent:

UNITED STATES PATENTS

| Number | Name | Date |
|---|---|---|
| 202,496 | Weymouth | Apr. 16, 1878 |
| 1,134,265 | Harper | Apr. 6, 1915 |
| 1,371,072 | Craig | Mar. 8, 1921 |
| 1,466,193 | Schuster | Aug. 28, 1923 |
| 2,376,469 | York | May 22, 1945 |